US012620082B2

(12) United States Patent
Umehara et al.

(10) Patent No.: US 12,620,082 B2
(45) Date of Patent: May 5, 2026

(54) INSPECTION APPARATUS AND METHOD FOR CALIBRATING INSPECTION APPARATUS

(71) Applicants: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

(72) Inventors: Masakazu Umehara, Toyota (JP); Shingo Mori, Kurokawa-gun (JP); Naoya Kishimoto, Nagoya (JP)

(73) Assignees: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 235 days.

(21) Appl. No.: 18/223,479

(22) Filed: Jul. 18, 2023

(65) Prior Publication Data

US 2024/0029236 A1     Jan. 25, 2024

(30) Foreign Application Priority Data

Jul. 22, 2022     (JP) ................................. 2022-117164

(51) Int. Cl.
*G06T 7/00*     (2017.01)
(52) U.S. Cl.
CPC ............ *G06T 7/001* (2013.01); *G06T 7/0006* (2013.01); *G06T 2207/30164* (2013.01)

(58) Field of Classification Search
CPC ................... G06T 7/001; G06T 7/0006; G06T 2207/30164; G06T 7/0004; G01N 21/89;
(Continued)

(56) References Cited

U.S. PATENT DOCUMENTS 7,387,965 B2 *  6/2008  Cho ........................ G01N 21/93
                                                              356/310
2002/0154308 A1    10/2002  Uesugi et al.
(Continued)

FOREIGN PATENT DOCUMENTS

JP          2001-066262 A      3/2001
JP            5316904 B2      10/2013
(Continued)

OTHER PUBLICATIONS

JP Office Action dated Apr. 16, 2024 as received in Application No. 2022-117164.

*Primary Examiner* — Sheela C Chawan
(74) *Attorney, Agent, or Firm* — Maschoff Brennan

(57) ABSTRACT
An inspection apparatus includes a support, an image capturing unit, and a controller. The support supports a workpiece. The image capturing unit generates captured image data including an image of the workpiece. The controller executes image processing on the captured image data to evaluate the workpiece. The support includes an engraved portion, including a groove and serving as a reference for inspection, on a surface of the support in a non-contact region that is free from contact with the workpiece. The engraved portion is included in an image capturing range of the image capturing unit. The controller evaluates the workpiece using a dimension of the engraved portion that is stored in the controller in advance and a reference image that is an image of the engraved portion.

8 Claims, 5 Drawing Sheets

(58) Field of Classification Search
CPC .... G01N 21/01; G01N 21/13; G01N 21/8901;
G01N 2021/0112
USPC ................................................. 382/100, 141
See application file for complete search history.

(56) References Cited

U.S. PATENT DOCUMENTS

2005/0009355 A1 \* 1/2005 Cho ................... G01N 21/9501
430/5
2006/0110024 A1 \* 5/2006 Wakabayashi ........ G06T 7/0006
382/141
2011/0249276 A1 10/2011 Minakuchi

FOREIGN PATENT DOCUMENTS

JP 2019-184489 A 10/2019
JP 2020091219 A \* 6/2020
WO 2010/082335 A1 7/2010

\* cited by examiner

X

Y

INSPECTION APPARATUS AND METHOD FOR CALIBRATING INSPECTION APPARATUS

BACKGROUND

1. Field

The following description relates to an inspection apparatus and a method for calibrating an inspection apparatus.

2. Description of Related Art

An optical apparatus is used to, for example, find defects in a mixture layer formed from an electrode paste, find wrinkles formed in a current collector, measure the width of the mixture layer, and the like (for example, refer to WO2010/082335). An example of such an inspection apparatus captures an image of an electrode sheet and processes the captured image.

This type of inspection apparatus may include a reference mark on a roller that conveys a workpiece. The inspection apparatus uses the reference mark to perform calibration of the inspection apparatus. The actual size of the reference mark is stored in the inspection apparatus in advance. The inspection apparatus captures an image of the reference mark and performs image processing on the captured image data to determine the number of pixels that corresponds to the image of the reference mark. Then, the inspection apparatus compares the number of pixels corresponding to the image of the reference mark with the actual size of the reference mark to determine the size of one pixel. Subsequently, the pixel size is applied to the image of the mixture layer or the workpiece, captured by the image capturing unit, to measure the width of the mixture layer, find defects in the mixture layer, and other evaluations. A sticker is used as the reference mark of the roller.

SUMMARY

When a sticker is applied to the roller, a step forms between the sticker and the roller surface. The step may cast a shadow. To avoid the formation of such a shadow, the sticker needs to be positioned immediately below a lighting device. However, the region immediately below the lighting device is used to convey a workpiece. Thus, the workpiece will have to be removed from this region before capturing an image of the sticker with the image capturing unit.

Further, if the sticker, which has a thickness, is left on the roller during inspection, the sticker will come into contact with the workpiece. Thus, the sticker may form a scratch or impression in the workpiece. In particular, when the workpiece is an electrode sheet of which the base material is a metal foil, the sticker may contact the metal foil and forms an impression in the metal foil. Thus, the sticker cannot be left on the roller when performing inspection, and the sticker will need to be removed from the roller after an image of the sticker is captured.

As described above, the generation of an image of the reference mark is troublesome. This decreases the frequency for calibrating the inspection apparatus with an image of the reference.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an inspection apparatus includes a support, an image capturing unit, and a controller. The support supports a workpiece. The image capturing unit generates captured image data including an image of the workpiece. The controller executes image processing on the captured image data to evaluate the workpiece. The support includes an engraved portion, including a groove and serving as a reference for inspection, on a surface of the support in a non-contact region that is free from contact with the workpiece. The engraved portion is included in an image capturing range of the image capturing unit. The controller evaluates the workpiece using a dimension of the engraved portion stored in the controller in advance and a reference image that is an image of the engraved portion.

In another general aspect, in a method for calibrating an inspection apparatus, the inspection apparatus includes a support, an image capturing unit, and a controller. The support supports a workpiece. The image capturing unit generates captured image data including an image of the workpiece. The controller executes image processing on the captured image data to evaluate the workpiece. The support includes an engraved portion, including a groove and serving as a reference for inspection, on a surface of the support in a non-contact region that is free from contact with the workpiece. The method includes capturing an image of the engraved portion with the image capturing unit to generate a reference image, and evaluating the workpiece using a dimension of the engraved portion and the reference image that is an image of the engraved portion.

In the above inspection apparatus, the support may be a conveyor roller. The engraved portion may be formed at an end, in an axial direction, of the conveyor roller.

In the above inspection apparatus, the groove of the engraved portion may include grooves arranged next to one another in a first direction and a second direction orthogonal to the first direction.

In the above inspection apparatus, the groove of the engraved portion may include grooves shaped to form a pattern of regular polygons.

In the above inspection apparatus, the groove of the engraved portion may include grooves extending diagonally to a first direction and a second direction orthogonal to the first direction.

In the above inspection apparatus, the support may be a conveyor roller. The engraved portion may extend continuously over the conveyor roller in a circumferential direction of the conveyor roller.

In the above inspection apparatus, the support may be a conveyor roller. The engraved portion may be formed in a number of positions in a circumferential direction of the conveyor roller.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of an inspection apparatus and a method for calibrating an inspection apparatus will now be described.

Configuration of Inspection Apparatus

Figure 1:
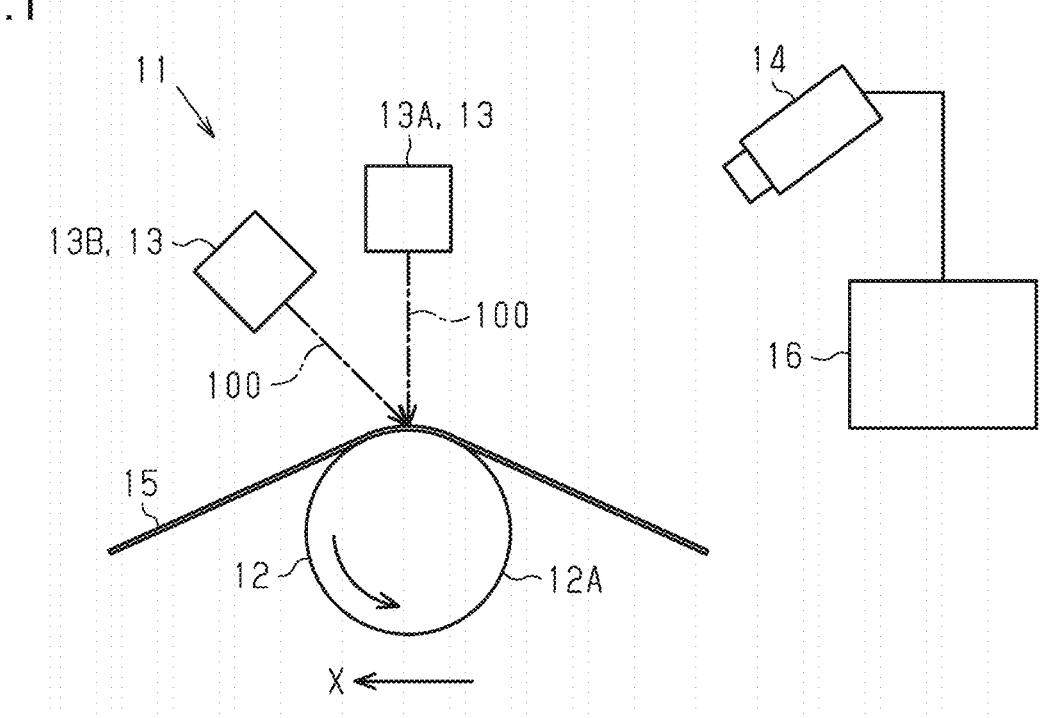
FIG. 1 is a schematic diagram of an inspection apparatus in accordance with an embodiment.

FIG. 1 shows an inspection apparatus 11. The inspection apparatus 11 of the present embodiment is an apparatus that inspects an electrode sheet of a battery. The electrode sheet includes a mixture layer in which an active material is formed on a current collector sheet that is formed from a metal foil. The inspection apparatus 11 is part of a coater that coats the current collector sheet with an active material paste. The coating unit is not shown in FIG. 1.

The inspection apparatus 11 includes a conveyor roller 12 serving as a support, a lighting device 13, and an image capturing unit 14. The conveyor roller 12 supports and conveys a workpiece 15, which is an electrode sheet. The conveyor roller 12 has the form of a cylinder or a column. The rotation of the conveyor roller 12 about a rotation shaft conveys the workpiece 15, which is an electrode sheet, in a first direction X. The inspection apparatus 11 includes two lighting devices 13A and 13B. The lighting device 13A is arranged directly above the conveyor roller 12. The lighting device 13B is arranged above the conveyor roller 12 and at a downstream side of the workpiece 15 with respect to the lighting device 13A in the first direction X. The lighting device 13A emits an inspection light 100 toward the workpiece 15, conveyed by the conveyor roller 12, from directly above. The lighting device 13B emits the inspection light 100 toward the workpiece 15 at an angle such that the incident angle of the light is less than 900 relative to the workpiece 15. The inspection light 100 is white light.

Alternatively, the inspection light 100 may be a light having a predetermined wavelength range within the visible light range.

The image capturing unit 14 captures an image of the workpiece 15 in a state in which the workpiece 15 is irradiated with the light. For example, the image capturing unit 14 includes a charge-coupled device (CCD). Alternatively, the image capturing unit 14 may include a complementary metal-oxide-semiconductor (CMOS) sensor or the like. The image capturing unit 14 generates captured image data that is gray-scale image data having 4096 shades expressed by 12 bits. However, there is no limitation to the number of shades or the color mode. The captured image data may have a different number of shades, such as 256 shades. Alternatively, the captured image data may be RGB image data.

The image capturing unit 14 outputs the captured image data to a controller 16. The controller 16 includes one or more processors, such as a central processing unit (CPU) and a graphics processing unit (GPU), and a memory serving as a main storage device (storage medium) that is data readable and writable by the processors. Further, the controller 16 includes an auxiliary storage device such as a magnetic disk, an optical disc, or a semiconductor memory. The processors store an operating system and an inspection program, which are stored in the auxiliary storage device, in the memory and execute various instructions retrieved from the memory. The inspection program has the processors execute processes to calculate the tone difference between adjacent pixels using the captured image data. The controller 16 corresponds to a controller recited in the claims.

Figure 2:
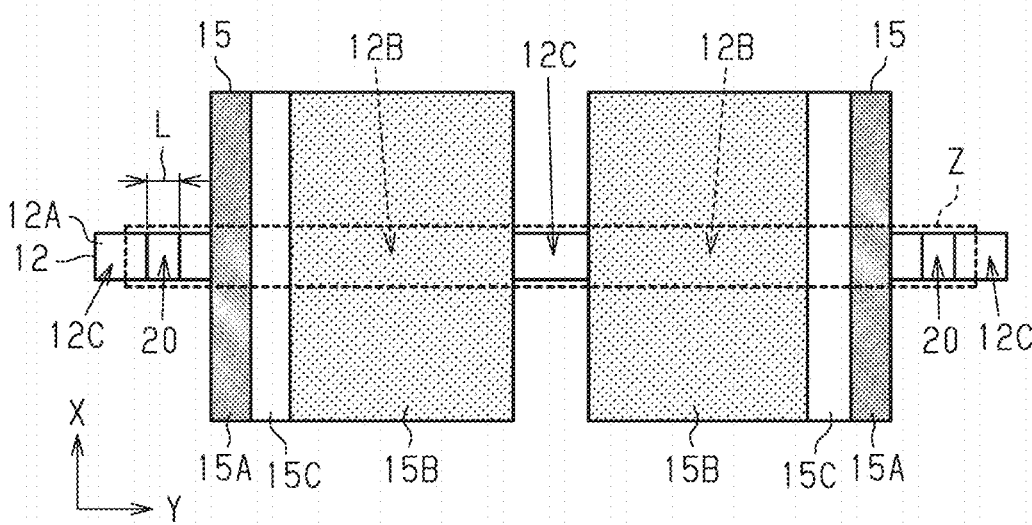
FIG. 2 is a schematic view showing part of the inspection apparatus in accordance with the embodiment.

FIG. 2 is a plan view of the workpieces 15 and the conveyor roller 12. The conveyor roller 12 includes a surface of a hard layer formed from a diamond-like carbon (DLC) or the like. Alternatively, the entire conveyor roller 12 may be formed from a hard material except for the rotation shaft. A surface 12A of the conveyor roller 12 includes a contact region 12B that comes into contact with the workpiece 15 and a non-contact region 12C. The conveyor roller 12 includes an engraved portion 20 in part of the non-contact region 12C at two longitudinal ends of the conveyor roller 12. The engraved portions 20 is formed as a reference used in an inspection.

When the engraved portion 20 is irradiated with the inspection light 100 emitted by the lighting device 13, the engraved portion 20 produces an optical effect differing from that in the surface of the workpiece 15 and portions of the non-contact region 12C other than the engraved portion 20. In the present embodiment, the engraved portion 20 has a characteristic that diffuses (scatters) the inspection light 100. The surface of the engraved portion 20 is rougher than portions of the surface 12A other than the engraved portion 20. In other words, the engraved portion 20 has an arithmetic average roughness or a maximum height roughness that is greater than those in the surface of the workpiece 15 and the portions of the non-contact region 12C other than the engraved portion 20.

The engraved portion 20 extends continuously over the conveyor roller 12 in a circumferential direction of the conveyor roller 12. The engraved portion 20 has the form of a belt extending in the circumferential direction of the conveyor roller 12.

The engraved portion 20 includes grooves formed in a surface and the surface between the grooves. The grooves may be formed by any method. For example, the grooves may be formed by laser engraving in which a laser light is emitted toward the surface 12A of the conveyor roller 12 to sublimate the material. Alternatively, the grooves may be formed by, for example, mechanical engraving in which an original plate is pressed against the conveyor roller 12, etching in which a chemical is brought into contact with predetermined portions of the conveyor roller 12 to cause corrosion, electric engraving in which a diamond needle is brought into contact with the conveyor roller 12. The grooves may also be referred to as recesses or depressions.

The conveyor roller 12 conveys two workpieces 15. Two contact regions 12B that come into contact with the two workpieces 15 are located on the surface 12A of the conveyor roller 12. The contact regions 12B are located between two non-contact regions 12C. That is, the contact regions 12B do not overlap the engraved portions 20. Another non-contact region 12C is located between two contact regions 12B.

Each workpiece 15 is a laminate of a current collector sheet 15A, a mixture layer 15B, and an insulative protection layer 15C. The current collector sheet 15A is formed from a metal film. The mixture layer 15B includes an active material that directly contributes to cell reaction, a conductive auxiliary agent, a binder, and the like. The workpiece 15 shown in FIG. 2 is a positive electrode sheet, and the current collector sheet 15A is an aluminum foil. The positive electrode workpiece 15 further includes the insulative protection layer 15C arranged between the current collector sheet 15A and the mixture layer 15B. When the workpiece 15 is a negative electrode sheet, the current collector sheet 15A is a copper foil.

An image capturing range Z of the image capturing unit 14 includes part of the engraved portions 20 and the workpieces 15. The image capturing range Z is wider than the total width of two workpieces 15. The image capturing range Z includes the entire length of two workpieces 15 in a second direction Y that is orthogonal to the first direction X and is parallel to the axial direction of the conveyor roller 12. Further, the image capturing range Z includes part of the workpieces 15 in the first direction X. The controller 16 executes known image processing on the obtained captured image data to perform calibration of the inspection apparatus 11 and evaluate the workpieces 15.

The controller 16 detects the width (length in the second direction Y) of the mixture layer 15B, defects in the mixture layer 15B, wrinkles formed in the current collector sheet 15A, and the like. For example, the width of the mixture layer is obtained based on the pixel size, or the actual size (dimension) corresponding to one pixel in the captured image data, and the number of pixels occupied by the mixture layer 15B in the image. For example, the width of the mixture layer 15B is determined by multiplying the pixel size by the number of pixels in the mixture layer 15B. Furthermore, defects in the mixture layer 15B and wrinkles formed in the current collector sheet 15A can be detected from the features and/or the sizes of edges detected based on tone differences of the pixels in the captured image data.

Engraved Portion

Figure 3:
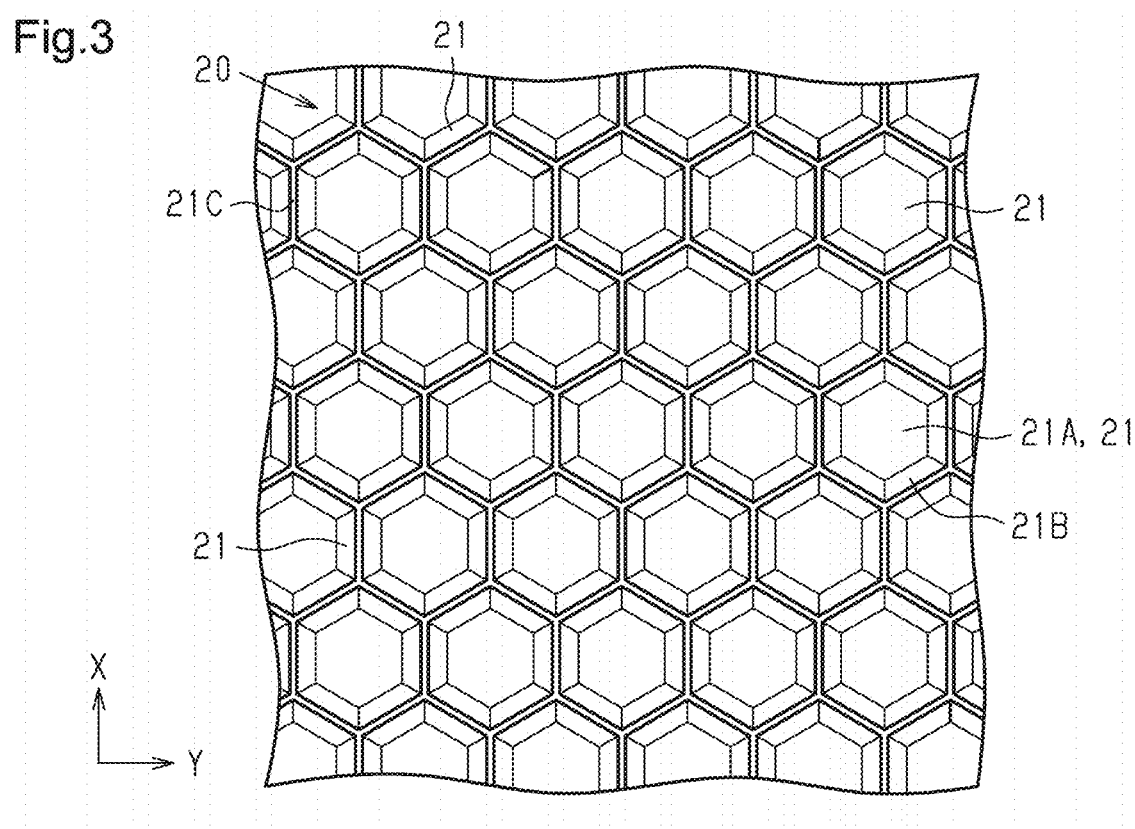
FIG. 3 is a plan view showing an engraved portion of the inspection apparatus in accordance with the embodiment.

The engraved portion 20 will now be described in detail with reference to FIGS. 3 and 4. FIG. 3 is an enlarged view of the engraved portion 20. The grooves 21 in the engraved portion 20 form a pattern in which regular polygons are arranged next to one another as viewed from the plane (surface 12A) of the conveyor roller 12. Each groove 21 is partitioned by walls 21C. In the example of FIG. 3, the engraved portion 20 forms a honeycomb-like (or hexagonal) pattern in which regular hexagons are arranged in the first direction X and the second direction Y in plan view of the conveyor roller 12. The grooves 21 are formed in both the first direction X and the second direction Y of the conveyor roller 12 as described above so that the inspection light 100 emitted by the lighting device 13 is scattered by the engraved portion 20 in a number of different directions. As a result, the amount of light reflected by the engraved portion 20 that is received by the image capturing unit 14 is less than the amount of light reflected by the peripheral regions of the engraved portion 20. The grooves 21 may be manufactured in any method and may form any pattern (design) as long as a predetermined tone difference is obtained between the engraved portion 20 and the portions of the surface 12A of the conveyor roller 12 other than the engraved portion 20. FIG. 3 shows an example of the grooves 21 formed by mechanical engraving. In the case of laser engraving, the heat of a laser beam sublimates the material so that the edges of the regular hexagon are rounded.

If the engraved portion 20 includes grooves extending parallel to the first direction X or the second direction Y, moire patterns will be shown in the captured image data of the engraved portion 20. However, when the grooves 21 form a pattern of regular polygons as in the present embodiment, moire patterns are not produced. Further, the regular polygonal pattern allows the engraved portion 20 to evenly diffuse the inspection light 100. Accordingly, the tone of the engraved portion 20 becomes uniform in the captured image data.

Figure 4:
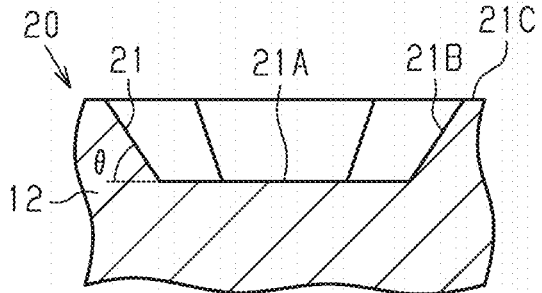
FIG. 4 is a cross-sectional view showing part of the engraved portion of the inspection apparatus in accordance with the embodiment.

FIG. 4 is a cross-sectional view of the engraved portion 20. Each groove 21 has a bottom surface 21A and inner side surfaces 21B. In the example of FIG. 4, the angle θ of the inner side surface 21B relative to the bottom surface 21A is less than 90°. Alternatively, the groove 21 may have a U-shaped cross section. Further alternatively, the angle of the inner side surface 21B of the groove 21 may be 90°. The engraved portion 20 includes a number of cells each having a trapezoidal cross section.

Operation

The operation of the engraved portion 20 and a method for calibrating the inspection apparatus 11 will now be described.

During an inspection, the inspection apparatus 11 captures an image of the workpiece 15 irradiated with the inspection light 100 while conveying the workpiece 15 with the conveyor roller 12. The controller 16 uses the captured image data to evaluate the workpiece 15. During the inspection, the position of the image capturing unit 14 may be unintentionally displaced. In this case, the relative distance between the workpiece 15 and the image capturing unit 14 may change. Such a change varies the pixel size of the captured image data that is used as a reference for the inspection, thereby lowering accuracy in the evaluation of the workpiece 15.

Accordingly, the controller 16 periodically performs calibration using the engraved portion 20 and updates the pixel size. In the calibration, the controller 16 detects the boundary between the engraved portion 20 and the surface 12A of the conveyor roller 12 as an edge (contour).

The controller 16 stores the actual size L (refer to FIG. 2) of the engraved portion 20 in the second direction Y in a memory. The controller 16 uses an image of the engraved portion 20 included in the captured image data as a reference image. The controller 16 determines the number of pixels located in the widthwise direction (second direction Y) of the reference image. Then, the controller 16 compares the number of pixels in the reference image with the actual size L of the engraved portion 20 to determine the pixel size, or the length of one pixel in the captured image data.

The engraved portion 20 is less likely to form a shadow compared to when a sticker is used as the reference. Although a sticker needs to be positioned immediately below the lighting device 13, there is little limitation on the position of the engraved portion 20. This allows the engraved portion 20 to be formed in an end of the conveyor roller 12 that does not interfere with the workpiece 15. Since the engraved portion 20 does not overlap the workpiece 15, the engraved portion 20 is continuously included in the image capturing range Z during an inspection. In other words, the image capturing unit 14 can capture the engraved portion 20 and the workpiece 15 included in the image capturing range Z throughout an inspection. In this manner, the workpiece 15 does not have to be removed and rearranged for calibration. Also, calibration of the inspection apparatus 11 and evaluation of the workpiece 15 can be performed simultaneously.

Figure 5:
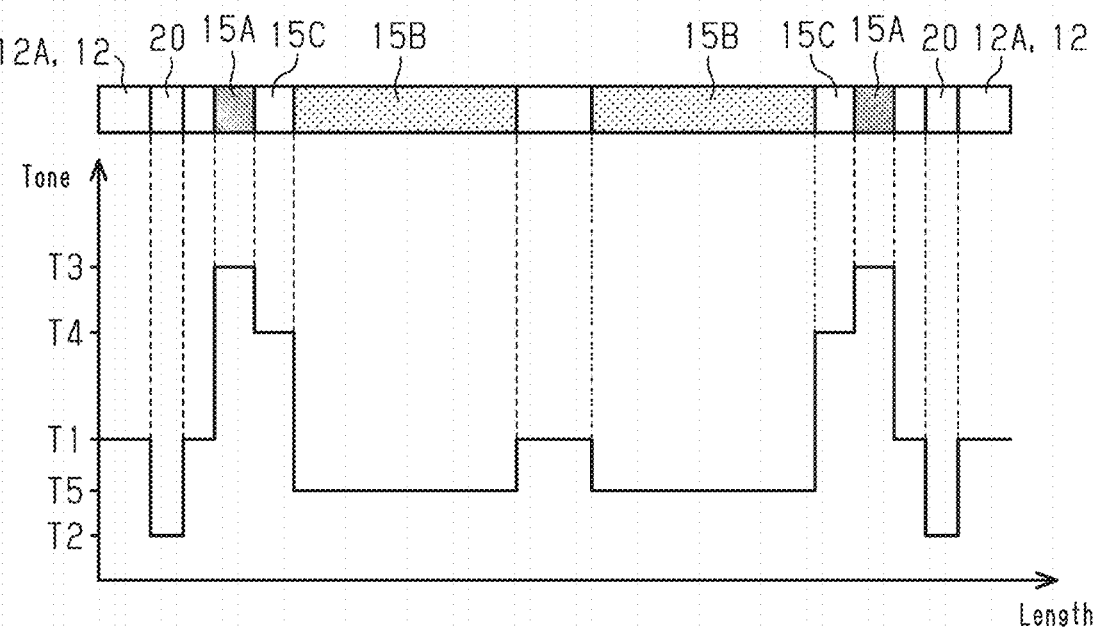
FIG. 5 is a graph showing the gradations of a reference image in the embodiment.

FIG. 5 shows gradations of the captured image data in the second direction Y. In FIG. 5, the workpiece 15 is illustrated as a positive electrode sheet. The horizontal axis represents the distance from the end of the conveyor roller 12, and the vertical axis represents the tone. An edge is detected when the tone of one pixel is at least a predetermined times greater than that of an adjacent pixel. For example, a predetermined times greater means 1.05 times greater, and preferably, 1.5 times greater.

The tone of a position where the surface 12A of the conveyor roller 12 is captured in the captured image data is tone T1. Tone T2 of the engraved portion 20 (reference image) in the present embodiment is lower than tone T1. Since tone T1 is at least the predetermined times greater than tone T2, the controller 16 detects the boundary between the engraved portion 20 and the surface 12A as an edge. When the controller 16 detects two edges corresponding to the engraved portion 20 in the axial direction of the conveyor roller 12, the controller 16 determines the number of pixels between the edges. Subsequently, the controller 16 determines the pixel size based on the number of pixels and the actual size L of the engraved portion 20.

In the conveyor roller 12 and the workpiece 15, the current collector sheet 15A has a relatively high reflectivity. Thus, tone T3 of the current collector sheet 15A is higher than tone T1 of the surface 12A of the conveyor roller 12 and tone T2 of the engraved portion 20. The controller 16 corrects the value of the tone in the captured image data so that tone T3 of the current collector sheet 15A is the maximum value.

Tone T4 of the insulative protection layer 15C is lower than tone T3 of the current collector sheet 15A. Tone T5 of the mixture layer 15B is lower than tone T4 of the insulative protection layer 15C and tone T1 of the surface 12A of the conveyor roller 12. Tone T3 of the current collector sheet 15A is at least the predetermined times greater than tone T1 of the surface 12A of the conveyor roller 12 and tone T4 of the insulative protection layer 15C, which are regions adjacent to the current collector sheet 15A. Tone T4 of the insulative protection layer 15C is at least the predetermined times greater than tone T5 of the adjacent mixture layer 15B. Tone T1 of the surface 12A of the conveyor roller 12 is at least the predetermined times greater than tone T5 of the mixture layer 15B. In this manner, the controller 16 recognizes the boundaries between the surface 12A of the conveyor roller 12, the current collector sheet 15A, the insulative protection layer 15C, and the mixture layer 15B during an inspection.

The above embodiment has the following advantages.

(1) Compared to when a sticker is arranged on the conveyor roller 12 as a reference, the engraved portion 20 is less likely to form a shadow. This improves the freedom of design for the position of the engraved portion 20, thereby allowing the engraved portion 20 to be formed in the non-contact region 12C of the conveyor roller 12 that is free from contact with the workpiece 15. When the engraved portion 20 is arranged in the non-contact region 12C, the workpiece 15 does not have to be removed before capturing an image of the engraved portion 20. Also, the engraved portion 20 and the workpiece 15 can be captured at the same time. This simplifies the task of generating a reference image and increases the frequency for calibrating the inspection apparatus 11.

(2) The engraved portion 20 is located at the end of the conveyor roller 12 where the engraved portion 20 will not affect inspections. Accordingly, the engraved portion 20 and the workpiece 15 do not interfere with each other. Thus, the workpiece and the engraved portion can be captured at the same time.

(3) The grooves 21 arranged next to one another in the first direction X and the second direction Y produce an optical effect differing from that in the peripheral regions of the engraved portion. That is, the engraved portion 20 diffuses the inspection light 100 emitted toward the conveyor roller 12. Thus, a lower tone is shown in the engraved portion 20 than the peripheral regions in the captured image data. In this manner, the boundaries of the engraved portion 20 are detected as edges.

(4) The engraved portion 20 including the grooves 21, each having the form of a regular polygon, produces an optical effect differing from that in the peripheral regions of the engraved portion 20. That is, the engraved portion 20 diffuses the inspection light 100 emitted toward the conveyor roller 12. Thus, a lower tone is shown in the engraved portion 20 than the peripheral regions in the captured image data. In this manner, the boundaries of the engraved portion 20 are detected as edges.

(5) The engraved portion 20 extends continuously over the conveyor roller in the circumferential direction of the conveyor roller 12. This allows the engraved portion 20 to be captured at any position in the circumferential direction of the rotating conveyor roller 12. Accordingly, the engraved portion 20 can be captured at any time throughout an inspection in which the workpiece 15 is being conveyed.

OTHER EMBODIMENTS

The above embodiment may be modified as follows. The above embodiment and the following modifications can be combined as long as the combined modifications remain technically consistent with each other.

In the above embodiment, the grooves 21 form a regular hexagonal pattern. However, the grooves 21 may form a pattern of a regular polygon other than a regular hexagon.

Figure 6:
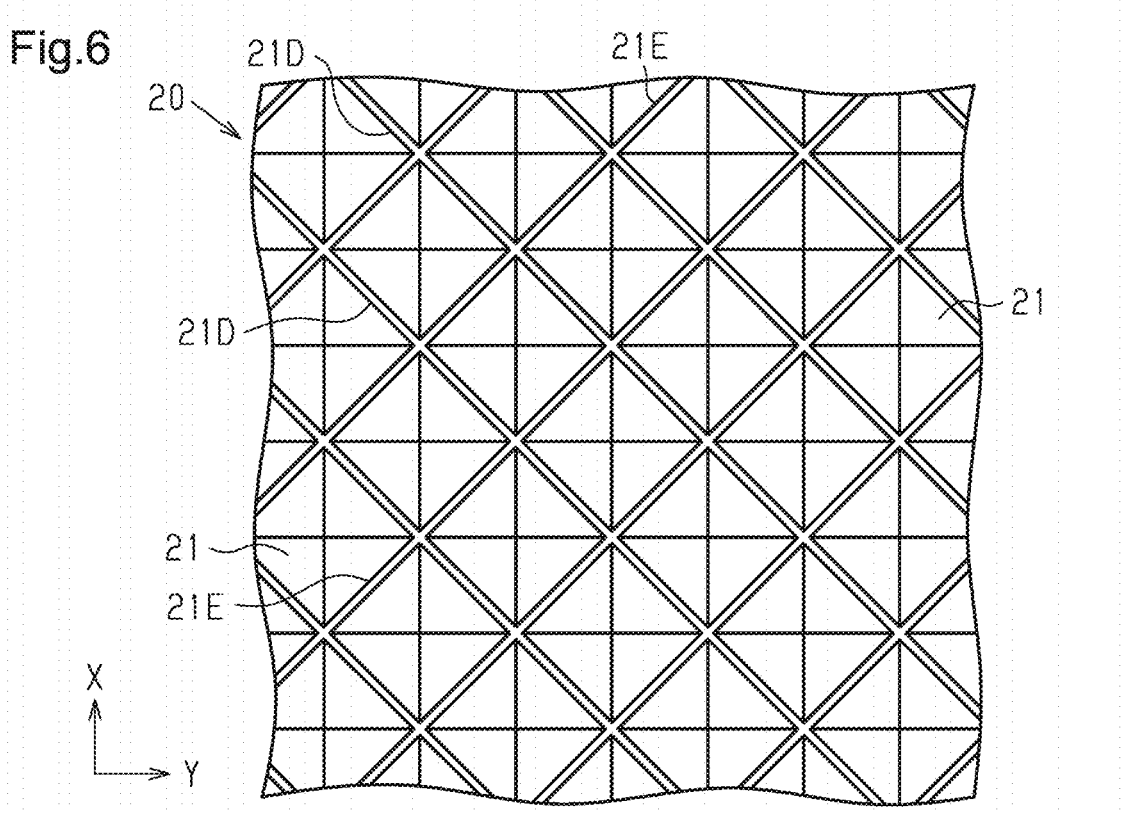
FIG. 6 is a plan view showing an engraved portion of an inspection apparatus in accordance with a modified example.

FIG. 6 shows the engraved portion 20 including the grooves 21 that form a pattern in which squares are arranged next to one another in plan view. Each groove 21 is shaped as a quadrangular pyramid. The cross sectional area of the groove 21 becomes smaller as the groove 21 becomes deeper. In other words, the engraved portion 20 includes a number of pyramidal cells. Walls 21D and walls 21E, which extending in a direction intersecting the walls 21D, partition the grooves 21. The walls 21D and 21E may differ in height. Such an engraved portion 20 produces an optical effect differing from that in the peripheral regions of the engraved portion 20.

The grooves 21 may form a pattern other than regular polygons.

Figure 7:
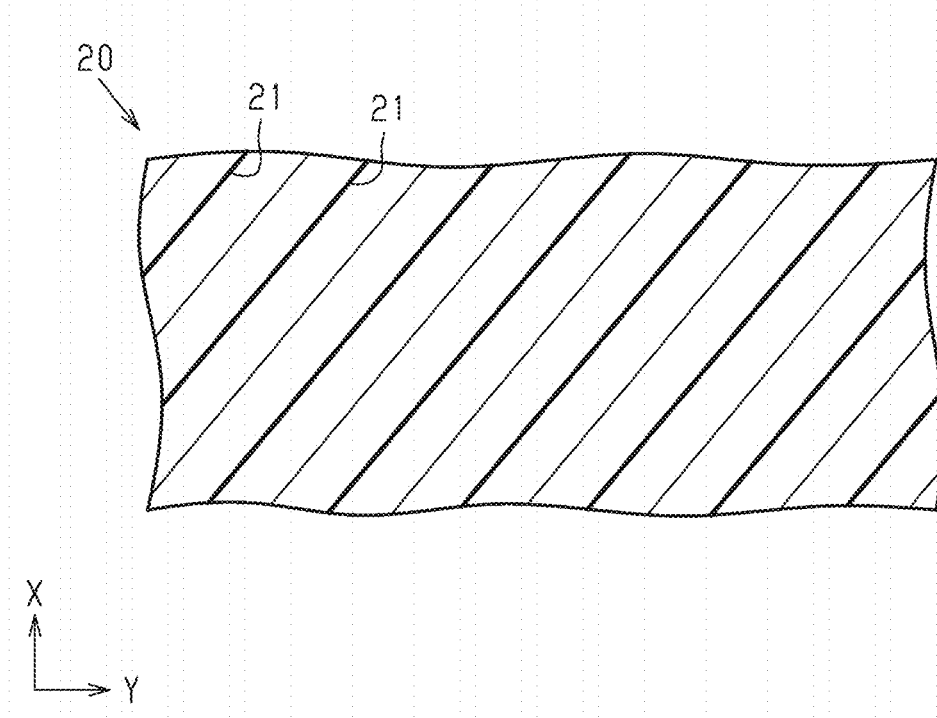
FIG. 7 is a plan view showing an engraved portion of an inspection apparatus in accordance with a modified example.
Figure 8:
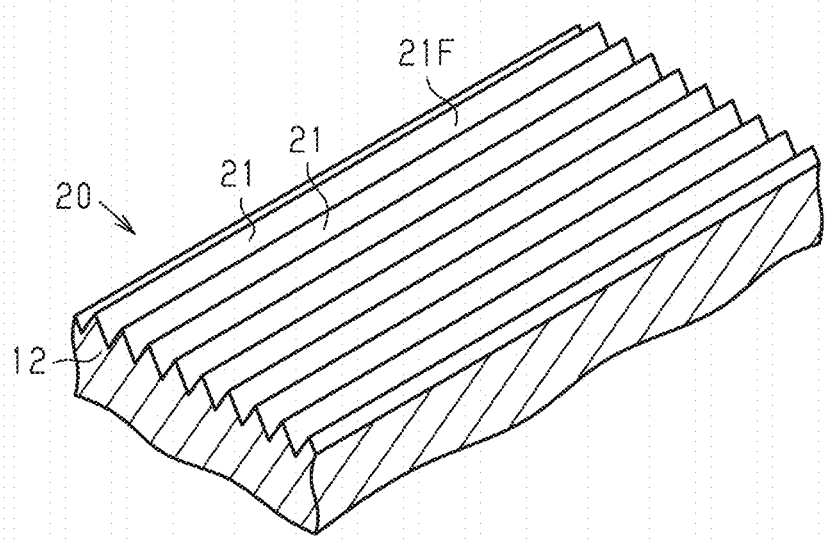
FIG. 8 is a perspective view including cross sections of the engraved portion of the inspection apparatus in accordance with the modified example.

FIGS. 7 and 8 show the engraved portion 20 including the grooves 21 that form a pattern of diagonal lines. As shown in FIG. 7, the grooves 21 include grooves extending diagonally to the first direction X and the second direction Y. The grooves 21 are partitioned by walls 21F. The grooves 21 are formed in the circumferential direction of the conveyor roller 12. As shown in FIG. 8, each groove 21 has two inclined surfaces that form a V-shaped cross section.

The engraved portion 20 including the diagonal linear grooves 21 produces an optical effect differing from that in the peripheral regions of the engraved portion 20. That is, the engraved portion 20 diffuses the inspection light 100 emitted toward the conveyor roller 12. Thus, a lower tone is shown in the engraved portion 20 than the peripheral regions in the captured image data. In this manner, the boundaries of the engraved portion 20 are detectable as edges.

The diagonal linear grooves 21 may be arranged in an intersecting pattern that includes grooves 21 extending in one direction and grooves 21 extending in an intersecting direction.

The groove 21 may include grooves having different depths. The walls of the groove 21 may include a cutout.

The groove 21 may be circular in plan view. The groove 21 may be a curved groove. The grooves 21 form a geometric pattern, but may form a pattern of randomly positioned symbols or a pattern of irregular and fine ridges and valleys. That is, the engraved portion 20 may only produce an optical effect differing from that in the peripheral regions such that the boundaries are recognizable in the image processing.

Figure 9:
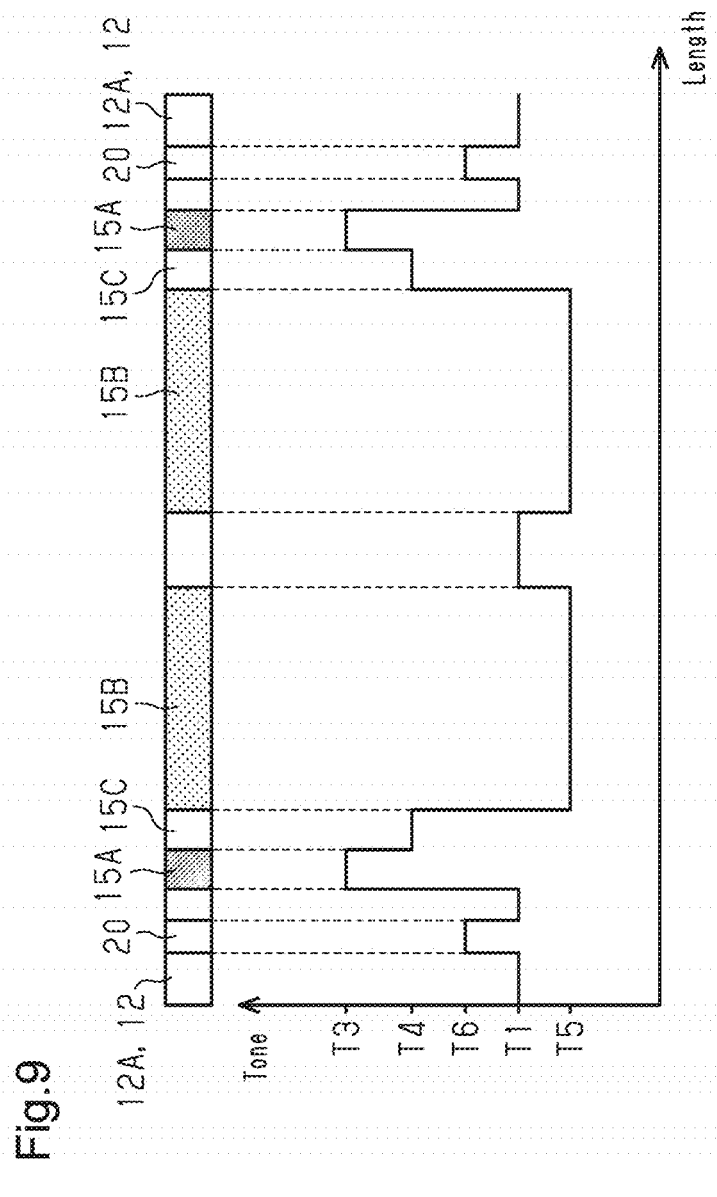
FIG. 9 is a graph showing the gradations of a reference image in a modified example.

In the above embodiment, tone T2 of the engraved portion 20 is lower than tone T1 of the surface 12A of the conveyor roller 12. Alternatively, as shown in FIG. 9, tone T6 of the engraved portion 20 may be a higher value than the tone T1 of the surface 12A of the conveyor roller 12 as long as tone T6 of the engraved portion 20 is at least predetermined times, such as 1.05 times, greater than to tone T1 of the surface 12A of the conveyor roller 12. That is, the engraved portion 20 may only produce an optical effect differing from that in the peripheral regions such that the boundaries are detectable. For example, when the groove 21 is shallow, the light reflected by the bottom surface of the groove 21 is more likely to be detected. Thus, tone T6 is higher than tone T1. Even in this case, the boundaries of the engraved portion 20 are recognizable as long as tone T6 is at least a predetermined times greater than tone T1.

The engraved portion 20 may be formed in the non-contact region 12C located between the two contact regions 12B instead of the non-contact regions 12C at the ends of the conveyor roller 12.

The engraved portion 20 may be formed in a number of positions in the circumferential direction of the conveyor roller 12. In other words, a number of engraved portions 20 may be formed at intervals in the circumferential direction of the conveyor roller 12. Also, in this case, an image of the engraved portion 20 can be captured while the workpiece 15 is being inspected.

In the above embodiment, the image capturing unit 14 is connected to the controller 16. However, the image capturing unit 14 may include a processor, serving as a controller, and a memory.

In the above embodiment, the inspection apparatus 11 is embodied in a device that inspects an electrode sheet coated with the mixture layer 15B. The application of the inspection apparatus 11 is not limited to evaluations of such an electrode sheet. The inspection apparatus 11 may be used for a pressing machine that applies a predetermined amount of pressure to the electrode sheet. The inspection apparatus 11 does not have to be part of a manufacturing device and may be a stand-alone apparatus. The inspection apparatus 11 may be included in a roll-to-roll processing type manufacturing apparatus or a single sheet processing type manufacturing apparatus. Further, the support for conveying the workpiece 15 is not limited to the conveyor roller 12. For example, the support may be a conveying unit that conveys a workpiece, such as a conveyor belt, or a placement table on which a single workpiece is set.

REFERENCE EXAMPLES

Reference examples will now be described. These reference examples do not limit the present invention.

Reference Example 1

A 6000-pixel monochrome digital camera was used as the image capturing unit 14 of the inspection apparatus 11. The lighting device 13 was a light-emitting diode (LED) lighting device that emits the inspection light 100, which is white light.

The conveyor roller 12 included the surface of a hard layer formed from DLC. The engraved portion 20 was formed in two ends of the conveyor roller 12 with a laser beam. The grooves 21 of the engraved portion 20 formed a pattern in which regular hexagons are arranged next to one another. Details of the engraved portion 20 are described below.

Number of lines: 250 lines/inch
Depth: 25 μm
Volume: 10 cm$^3$/m$^2$
Angle θ: 60°

The number of lines represents the number of grooves 21 per inch in the second direction Y of the conveyor roller 12. The depth is based on the deepest position (bottom surface 21A) of the groove 21. The volume refers to the volume of the grooves 21 within a region of 1 m$^2$ on the surface 12A of the conveyor roller 12. The angle θ is the inclination angle of the inner side surface 21B relative to the bottom surface 21A.

Reference Example 2

The inspection apparatus 11 was configured in the same manner as Reference Example 1 except for the engraved portion 20.

Number of lines: 495 lines/inch
Depth: 14 μm
Volume: 5.7 cm$^3$/m$^2$
Angle θ: 57°

Reference Example 3

The inspection apparatus 11 was configured in the same manner as Reference Example 1 except for the engraved portion 20.

Number of lines: 1000 lines/inch
Depth: 9 μm
Volume: 3.7 cm$^3$/m$^2$
Angle θ: 78°

Evaluations

Evaluations were conducted to determine whether the engraved portions 20 of Reference Examples 1 to 3 were detectable as reference images during an inspection of a workpiece. A positive electrode sheet was used as the workpiece 15. In the workpiece 15, the current collector sheet 15A was formed from an aluminum foil, and the insulative protection layer 15C included boehmite. The mixture layer 15B included a nickel-cobalt-manganese-oxide (NCM) based positive electrode active material, a conductive auxiliary agent including acetylene black and carbon nanotubes, and a binder of polyvinylidene fluoride (PVdF).

After the workpiece 15 was set on the conveyor roller 12, an image of the workpiece 15 and the engraved portion 20 was captured while the workpiece 15 was being conveyed so as to generate data of a gray-scale image having 4096 shades. The tone of the current collector sheet 15A was corrected to correspond the maximum value (4095), and then tone T2 of the engraved portion 20 and tone T1 of the surface 12A of the conveyor roller 12 were determined. Subsequently, it was evaluated whether tone T1 was at least a predetermined times greater than tone T2. Alternatively, when tone T2 of the engraved portion 20 was higher than tone T1, it was evaluated whether tone T2 was at least a predetermined times greater than tone T1. When the predetermined times greater meant at least 1.05 times greater and less than 1.5 times greater, "Δ (triangle)" was given. When the predetermined times greater meant at least 1.5 times greater and less than 4.2 times greater, "○ (circle)" was given. When the predetermined times greater meant at least 4.2 times greater, "◎ (double circle)" was given. As the evaluation shifts from "Δ (triangle)" toward "◎ (double circle)", the boundary of the engraved portion 20 appears as a clearer edge in edge detection processing. The tone difference was 1.5 times or greater between adjacent pixels at the boundaries between the surface 12A of the conveyor roller 12, the current collector sheet 15A, the insulative protection layer 15C, and the mixture layer 15B. Therefore, these boundaries were detectable as edges.

TABLE 1

|  | Reference Example 1 | Reference Example 2 | Reference Example 3 |
|---|---|---|---|
| Number of Lines (lines/inch) | 250 | 495 | 1000 |
| Depth (μm) | 25 | 14 | 9 |
| Volume (cm³/m²) | 10 | 5.7 | 3.7 |
| Angle (°) | 60 | 57 | 78 |
| Evaluation (Positive Electrode) | 4.22x (◎) | 1.05x (Δ) | 1.15x (Δ) |
| Evaluation (Negative Electrode) | 7.68x (◎) | 1.59x (○) | 1.36x (Δ) |

Table 1 shows the results of the evaluations. Tone T1 of the surface 12A of the conveyor roller 12 was 608. In Reference Example 1, tone T2 of engraved portion 20 was 144. Tone T1 in Reference Example 1 was 4.22 times higher than tone T2 of the engraved portion 20, and thus "◎ (double circle)" was given.

In Reference Example 2, tone T2 of engraved portion 20 was 576. Tone T1 was 1.05 times higher than tone T2 of the engraved portion 20, and thus "Δ (triangle)" was given.

In Reference Example 3, tone T2 of engraved portion 20 was 704. Since the grooves 21 were shallow, tone T2 of the engraved portion 20 was higher than tone T1 of the surface 12A of the conveyor roller 12, as illustrated by tones T1 and T6 in FIG. 9. Tone T2 of the engraved portion 20 was about 1.15 times higher than tone T1, and thus "Δ (triangle)" was given.

In addition, the workpiece 15 was replaced by a negative electrode sheet and then evaluations were conducted. In the workpiece 15, the current collector sheet 15A was formed from a copper foil. The mixture layer 15B included a negative electrode active material of graphite, a viscosity increasing agent of carboxymethyl cellulose (CMC), and a binder of styrene-butadiene rubber (SBR). The captured image data was generated in the same manner as the workpiece 15 of the positive electrode sheet. The tone of the negative current collector sheet 15A was corrected to correspond the maximum value (4095), and then tone T2 of the engraved portion 20 and tone T1 of the surface 12A of the conveyor roller 12 were determined.

Tone T1 of the surface 12A of the conveyor roller 12 was 1352. In Reference Example 1, tone T2 of engraved portion 20 was 176. Tone T1 was 7.68 times higher than tone T2 of the engraved portion 20, and thus "◎ (double circle)" was given.

In Reference Example 2, tone T2 of engraved portion 20 was 848. Tone T1 was 1.59 times higher than tone T2 of the engraved portion 20, and thus "○ (circle)" was given.

In Reference Example 3, tone T2 of engraved portion 20 was 992. Tone T1 was 1.36 times higher than tone T2 of the engraved portion 20, and thus "Δ (triangle)" was given.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An inspection apparatus, comprising:
   a support that supports a workpiece;
   an image capturing unit that generates captured image data including an image of the workpiece; and
   a controller that executes image processing on the captured image data to evaluate the workpiece; wherein
   the support includes an engraved portion, including a groove and serving as a reference for inspection of the workpiece, on a surface of the support in a non-contact region that is free from contact with the workpiece,
   wherein the groove of the engraved portion includes grooves shaped to form a pattern of regular polygons, the regular polygons are identical in shape, and the regular polygons are arranged next to one another in a first direction and a second direction orthogonal to the first direction,
   the engraved portion is included in an image capturing range of the image capturing unit, and
   the controller evaluates the workpiece using a dimension of the engraved portion that is stored in the controller in advance and a reference image that is an image of the engraved portion.

2. The inspection apparatus according to claim 1, wherein
   the support is a conveyor roller, and
   the engraved portion is formed at an end, in an axial direction, of the conveyor roller.

3. The inspection apparatus according to claim 1, wherein the groove of the engraved portion includes grooves extending diagonally to a first direction and a second direction orthogonal to the first direction.

4. The inspection apparatus according to claim 1, wherein the support is a conveyor roller, and the engraved portion extends continuously over the conveyor roller in a circumferential direction of the conveyor roller.

5. The inspection apparatus according to claim 1, wherein the support is a conveyor roller, and the engraved portion is formed in a number of positions in a circumferential direction of the conveyor roller.

6. The inspection apparatus according to claim 1, further comprising a lighting device that emits inspection light toward the workpiece and the support from a plurality of directions, wherein the engraved portion diffuses the inspection light emitted from the plurality of directions, and the controller detects, using the captured image data, the reference image that has a region with a lower tone than other regions.

7. A method for calibrating an inspection apparatus, wherein:

the inspection apparatus includes a support that supports a workpiece, an image capturing unit that generates captured image data including an image of the workpiece, and a controller that executes image processing on the captured image data to evaluate the workpiece, the method comprising:

providing an engraved portion, including a groove and serving as a reference for inspection of the workpiece, on a surface of the support in a non-contact region that is free from contact with the workpiece, wherein the groove of the engraved portion includes grooves shaped to form a pattern of regular polygons, the regular polygons are identical in shape, the regular polygons are arranged next to one another in a first direction and a second direction orthogonal to the first direction, and the engraved portion is included in an image capturing range of the image capturing unit; and evaluating, by the controller, the workpiece using a dimension of the engraved portion and a reference image that is an image of the engraved portion.

8. A method for calibrating an inspection apparatus, wherein:

the inspection apparatus includes a support that supports a workpiece, an image capturing unit that generates captured image data including an image of the workpiece, and a controller that executes image processing on the captured image data to evaluate the workpiece; and the support includes an engraved portion, including a groove and serving as a reference for inspection of the workpiece, on a surface of the support in a non-contact region that is free from contact with the workpiece, and the engraved portion is included in an image capturing range of the image capturing unit; the method comprising:

detecting, by the controller, a reference image that is an image of the engraved portion;

identifying, by the controller, a dimension corresponding to one pixel in the captured image using a number of pixels in the reference image and an actual dimension of the engraved portion stored in the controller in advance; and evaluating, by the controller, the workpiece using the identified dimension.

* * * * *